US012561167B2

(12) United States Patent
Karthikeyan et al.

(10) Patent No.: US 12,561,167 B2
(45) Date of Patent: Feb. 24, 2026

(54) FEEDBACK-BASED TUNING OF TELEMETRY COLLECTION PARAMETERS

(71) Applicant: Cisco Technology, Inc., San Jose, CA (US)

(72) Inventors: Kishore Karthikeyan, Fremont, CA (US); Donny Chan, San Jose, CA (US); Roy Nidesh Kantharajah, La Crosse, WI (US)

(73) Assignee: Cisco Technology, Inc., San Jose, CA (US)

( * ) Notice: Subject to any disclaimer, the term of this patent is extended or adjusted under 35 U.S.C. 154(b) by 913 days.

(21) Appl. No.: 17/669,088

(22) Filed: Feb. 10, 2022

(65) Prior Publication Data

US 2023/0251902 A1      Aug. 10, 2023

(51) Int. Cl.
*G06F 9/50* (2006.01)
*G06F 11/34* (2006.01)

(52) U.S. Cl.
CPC ........ *G06F 9/5005* (2013.01); *G06F 11/3409* (2013.01)

(58) Field of Classification Search
CPC ............................ G06F 9/5005; G06F 11/3409
See application file for complete search history.

(56) References Cited

U.S. PATENT DOCUMENTS 7,191,150 B1    3/2007  Shao et al.
7,912,950 B1    3/2011  Saparoff

| | | | |
|---|---|---|---|
| 7,996,814 B1 * | 8/2011 | Qureshi | G06N 5/048 |
| | | | 717/172 |
| 8,392,923 B2 | 3/2013 | Walters | |
| 8,780,881 B2 | 7/2014 | Venkatachalam et al. | |
| 11,314,833 B1 * | 4/2022 | Juravicius | H04L 67/56 |
| 2002/0183972 A1 | 12/2002 | Enck | |
| 2008/0313345 A1 | 12/2008 | Bernardin et al. | |
| 2014/0237550 A1 * | 8/2014 | Anderson | H04L 63/0807 |
| | | | 726/22 |

(Continued)

FOREIGN PATENT DOCUMENTS

EP        0689144 A1    12/1995
WO    WO2019168442 A1     9/2019

OTHER PUBLICATIONS

Cisco, "Telemetry Configuration Guide for Cisco 8000 Series Routers, IOS XR Release 7.3.x," Oct. 13, 2021, retrieved from «https://www.cisco.com/c/en/us/td/docs/iosxr/cisco8000/telemetry/73x/b-telemetry-cg-8000-73x/AI-driven-telemetry.html» 8 pages.

(Continued)

*Primary Examiner* — Jacob D Dascomb
(74) *Attorney, Agent, or Firm* — Lee & Hayes, P.C.

(57) ABSTRACT

A method of tuning telemetry collection parameters may include, with a collector, receiving source data defining at least one application running on a plurality of nodes, the nodes utilizing a finite number of compute resources. With the collector, a number of score models within a scoring agent of the collector may be executed to define telemetry collection parameters used by the collector for source data collection. The method may also include computing, with the scoring agent, a number of scores based on disturbance features and adaptive feedback, and tuning, with the collector, the telemetry collection parameters based on the scores to obtain tuned telemetry collection parameters.

21 Claims, 7 Drawing Sheets

(56) References Cited

U.S. PATENT DOCUMENTS

| | | | |
|---|---|---|---|
| 2017/0168914 A1 | 6/2017 | Altman | |
| 2019/0028909 A1 | 1/2019 | Mermoud et al. | |
| 2019/0087256 A1 | 3/2019 | Horrell et al. | |
| 2019/0324437 A1* | 10/2019 | Cella | H04L 47/122 |
| 2019/0342194 A1 | 11/2019 | Mermoud et al. | |
| 2019/0379587 A1 | 12/2019 | Coutinho | |
| 2022/0021738 A1* | 1/2022 | Patel | H04L 43/0876 |

OTHER PUBLICATIONS

Heinzelman et al., "Adaptive Protocols for Information Dissemination in Wireless Sensor Networks," Fifth ACM/IEEE Mobicom Conference, Seattle, WA Aug. 1999, 12 pages.

Jeswani, Deepak, "Adaptive Monitoring: Application of Probing to Adapt Passive Monitoring", Journal of Network and Systems Management, vol. 23, No. 4, Sep. 12, 2014, pp. 950-977.

Machida et al., "Polling Schedule Optimization for Adaptive Monitoring to Scalable Enterprise Systems," International Journal on Advances in Intelligent Systems, vol. 1 No. 1, year 2008, »http://www.iariajournals.org/intelligent_systems/« 12 pages.

PCT Search Report and Written Opinion mailed May 8, 2023 for PCT Application No. PCT/US23/10604, 14 pages.

* cited by examiner

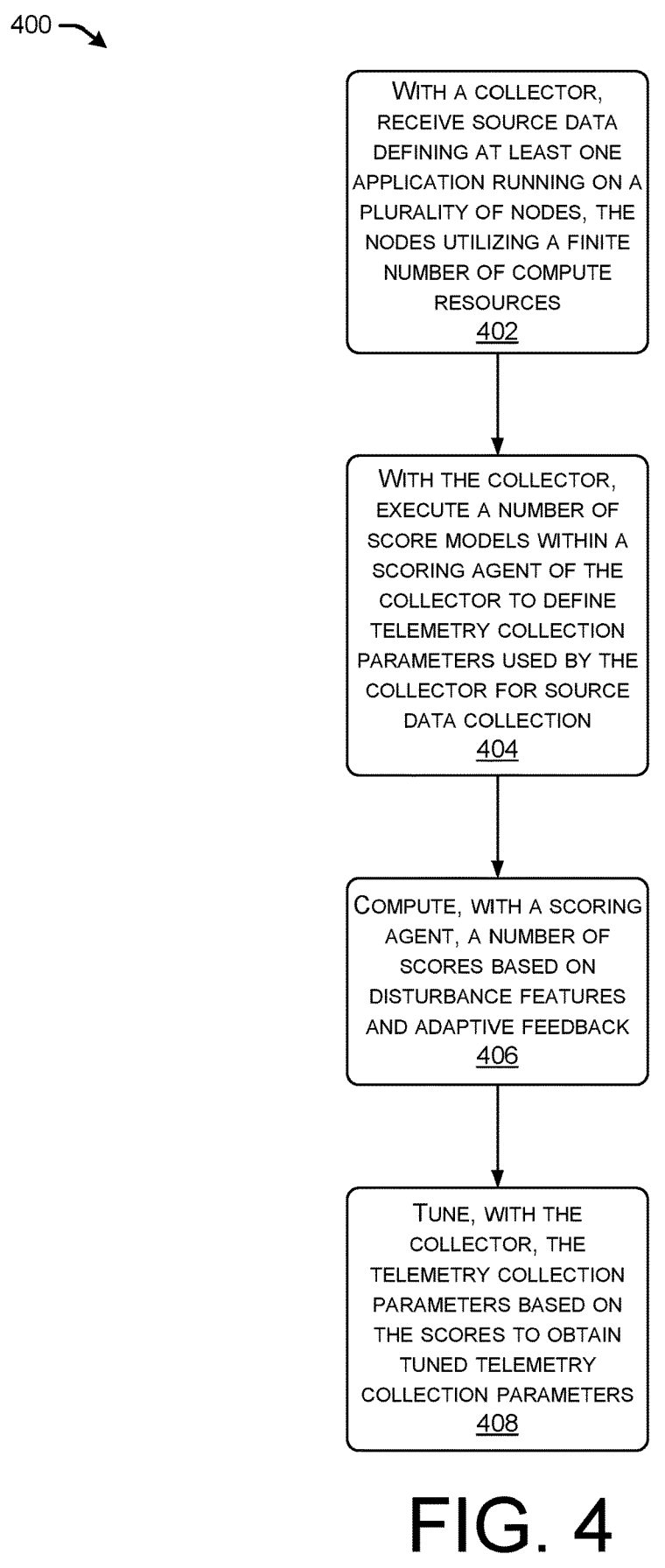

400

WITH A COLLECTOR, RECEIVE SOURCE DATA DEFINING AT LEAST ONE APPLICATION RUNNING ON A PLURALITY OF NODES, THE NODES UTILIZING A FINITE NUMBER OF COMPUTE RESOURCES
402

WITH THE COLLECTOR, EXECUTE A NUMBER OF SCORE MODELS WITHIN A SCORING AGENT OF THE COLLECTOR TO DEFINE TELEMETRY COLLECTION PARAMETERS USED BY THE COLLECTOR FOR SOURCE DATA COLLECTION
404

COMPUTE, WITH A SCORING AGENT, A NUMBER OF SCORES BASED ON DISTURBANCE FEATURES AND ADAPTIVE FEEDBACK
406

TUNE, WITH THE COLLECTOR, THE TELEMETRY COLLECTION PARAMETERS BASED ON THE SCORES TO OBTAIN TUNED TELEMETRY COLLECTION PARAMETERS
408

FIG. 4

FEEDBACK-BASED TUNING OF TELEMETRY COLLECTION PARAMETERS

TECHNICAL FIELD

The present disclosure relates generally to distributed microservice architectures. Specifically, the present disclosure relates to systems and methods for dynamically tuning telemetry collection parameters within a distributed microservice architecture using a distributed score model that can dynamically tune the collection parameters at the collection source based on a continuous system feedback.

BACKGROUND

Computer networking is ubiquitous and serves to allow for data to be transmitted from a first computing device within the network to a second computing device communicatively coupled to the first computing device. As computer networks become larger, it may be helpful to determine the health of one or more or a collection of physical and/or virtual devices within the network. Determining the health of the devices and the network may serve to alert an administrator to an issue and allow for the administrator to address these issues and create a more efficient computing network. For example, a distributed microservice architecture may include hundreds or thousands of pods, nodes, and/or network devices. In this example, health data may be collected from the pods, nodes, and/or network devices in order to, for example, respond to faults in a timely manner. However, a system including a distributed microservice architecture may include a finite amount of compute resources that may be applied to the health collection and monitoring system used for fault assurance. Although this issue may not be limited to a distributed microservice architecture, this concept of a finite amount of compute resources that may be used to determine health data collection and monitoring may extend to any computing system having thousands of network devices or nodes. Still further, this issue may not be limited to health data or fault assurance but may also extend to any data source collection system that attempts to efficiently use compute resources while also ensuring the objectives of executed applications within the computer network are being met.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method of tuning telemetry collection parameters, according to an example of the principles described herein.

DESCRIPTION OF EXAMPLE EMBODIMENTS

As mentioned above, with a finite number of compute resources that may be dedicated to any data source collection processes (e.g., health data collection and system monitoring), it may prove necessary to consider a most efficient manner by which a system uses those compute resources while also ensuring the objectives of executed applications within the computer network are being met.

Figure 3:
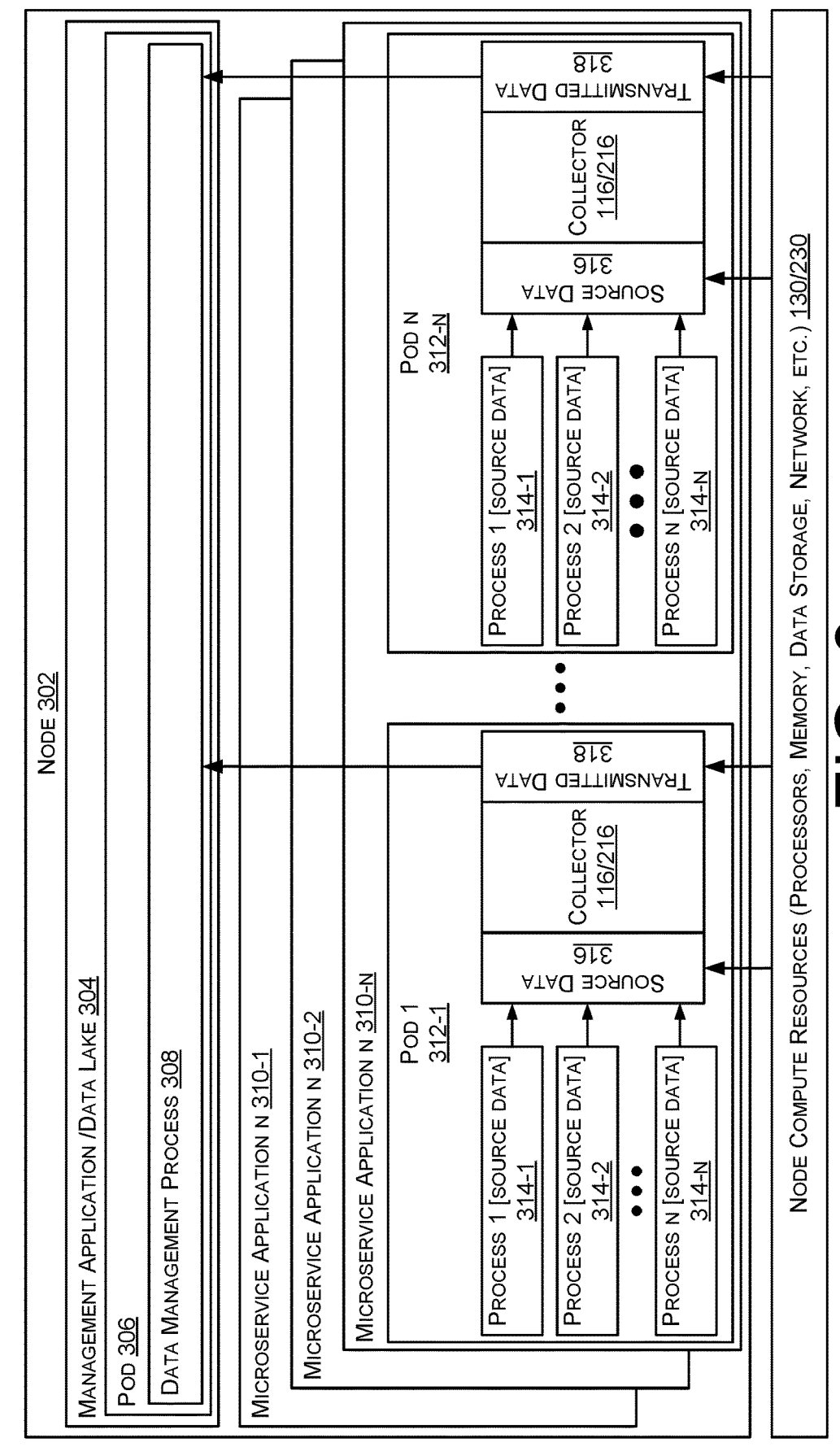
FIG. 3 illustrates a computing environment in which the systems of FIGS. 1 and 2 may operate, according to an example of the principles described herein.

A first class of problems observed in these above-described situations, compute resources such as processing resources (e.g., processors, central processing units (CPUs), etc.), memory resources, data storage resources, networking resources, or combinations thereof may strain at the source of data collection as opposed to the transmission of collected data by collectors within, for example, the computing environment of FIG. 3 to a management entity, management application, and/or a data lake. More details regarding FIG. 3 are provided below. Statically configured collection parameters may include cadence (e.g., a rate or frequency of data collection), type of data collected, the amount of data collected, other data collection parameters, and combinations thereof. The statistically configured collection parameters may include any data collected at the collection source. Further, the statistically configured collection parameters may be optimized for fault assurance but prioritizing for fault assurance purposes may lead to over subscription of computing resources for a given process.

In contrast, statically configured collection parameters at the collection source may be optimized for compute resource usage. However, optimization for compute resource usage may lead to, for example, poor results in providing fault assurance when data is not collected in the right way or in a timely manner.

Still further, tuning collection parameters such that both fault assurance and compute resource usage are addressed may result in a problematic or impossible balancing act. This may be especially true in situations where a service-level agreement (SLA) exists between a system provider (e.g., a service entity) and the beneficiary of those services such as an administrator or an entity.

Some systems may focus on transmission resource optimization by utilizing data filtering, machine learning (ML) algorithms, and/or heuristics as opposed to source collection resource optimization. These methods and systems may apply post collection data filtering such as the use of ML, events, and protocols to optimize data streaming including transmission and processing to the management entity. However, these methods and systems do not address or alleviate a compute resource tax associated with raw data collection. It may be a goal to provide a system where a number of administrators may have varying SLA agreements and allow the administrators to dynamically adjust such agreements in order to meet computing needs. Thus, a number of administrators may have different SLAs on how they want resources utilized with regards to achieving assurances and/or objectives of an application executed within the system. Thus, flexibility in allowing an administrator to define hoe compute resources are used may not be provided by use of the above-mentioned data filtering, ML algorithms, and/or heuristics.

A second class of problems may arise from the desire to implement dynamic tuning of collection parameters for fault assurance and resources usage in isolation or for a single microservice application. However, in practice a plurality of microservice applications may be executed within the system and may be competing for the same compute resources. Further, a number of administrators who each deploy a given set of applications may have different intent requirements and priorities associated with compute resource usage which, in turn, further impacts how competing compute resources should be allocated to the monitoring system for each application.

Thus, a problem the present systems and methods solve is the tuning of the collection parameters at the collection source to optimally balance objective function of fault assurance, for example, while optimizing usage the of the compute resources within the microservice architecture. Further, the present systems and methods provide for dynamically tuning telemetry collection parameters within a distributed microservice architecture using a distributed score model that can dynamically tune the collection parameters at the collection source based on a continuous system feedback.

Overview

In the examples described herein, the systems and methods described herein are directed to federated, policy-driven telemetry collection that provides a feedback loop to dynamically tune the telemetry collection parameters at a source device. The present systems and methods provide for closed-loop data source and transmission adaptive data collection. The adaptative adjustment of the collection parameters may be based on a score model generated by an adaptive score manager of a controller associated with a scoring agent of a collector.

Further, the present systems and methods provide for a score model may be generated based on parameter-driven intent as defined by the scoring agent. A set of data collection parameters may be used by the score model where the set of data collection parameters may be dynamically adjusted based on policy, location, and/or deployment.

Further, the present systems and methods provide for an adaptative score manager that may be distributed within the microservice architecture. The adaptative score manager (e.g., a score and intent engine) may be distributed throughout the microservice architecture or it may run on a single entity. In one example, the adaptative score manager may be flexible to run either distributed or on a single entity.

The present systems and methods utilize a score model to represent the collection parameters dynamically at the collection source. The present systems and methods to minimize both compute usage and failure parameters such as, for example, a mean time to recovery (MTTR).

Further, unlike other systems and methods that are optimized for network elements or peripheral device endpoints, the present systems and methods may be optimized for a clustering architecture. Still further, some systems and methods that require a handshaking protocol and the need for the data to be modeled in order to optimize the data collected. However, this does not work well for ad hoc data sources that cannot be modeled. The present systems and methods do not require any protocol and does not require the collected data to be defined in any model.

Other systems and methods may utilize historical weighted base and data patterns to adjust the collection parameters such as cadence. In contrast, the present systems and methods utilize a score model. This score model is intent based and may be tailored for a given use case. Further, the intent score model may include a propriety model that uses the health of components within the compute resources, the relationships within the system, and fault events in a clustering architecture to self-update in order to minimize both compute usage and MTTR.

Examples described herein provide a method of tuning telemetry collection parameters. The method may include, with a collector, receiving source data defining at least one application running on a plurality of nodes, the nodes utilizing a finite number of compute resources. With the collector, a number of score models within a scoring agent of the collector may be executed to define telemetry collection parameters used by the collector for source data collection. The method may also include computing, with the scoring agent, a number of scores based on disturbance features and adaptive feedback, and tuning, with the collector, the telemetry collection parameters based on the scores to obtain tuned telemetry collection parameters.

The adaptive feedback may be generated by an adaptive score manager of a controller. The method may further include, with the adaptive score manager, receiving system data from the compute resources. The system data defines at least one of node health, node availability, a health of the at least one application across the plurality of nodes, health of an infrastructure, or combinations thereof. The method may further include determining, with an objective function engine of the adaptive score manager, an assurance metric defining how close assurance requirements are met based on the system data, and generating, with an adaptive score engine of the adaptive score manager, a feedback score based at least in part on the assurance metric.

The method further incudes, with the adaptive score manager, generating, via a service level agreement (SLA) manager, at least one SLA policy based on user input. Further the method may include generating, with an adaptive score engine of the adaptive score manager, the feedback score based at least in part on the SLA policy. The adaptive feedback may be defined based on the feedback score. The method may further include collecting telemetric data from the compute resources for the nodes based on the tuned telemetry collection parameters. The disturbance features may include any factors that impact the telemetry collection parameters used to generate a disturbance score.

Examples described herein also provide a non-transitory computer-readable medium storing instructions that, when executed, causes a processor to perform operations. The operations may include receiving, with a collector, source data defining at least one application running on a plurality of nodes. The nodes utilize a finite number of compute resources. The operations further include executing, with the collector, a number of score models within a scoring agent of the collector to define telemetry collection parameters used by the collector for source data collection. The operations may further include computing, with the scoring agent, a number of scores based on disturbance features and adaptive feedback and tuning, with the collector, the telemetry collection parameters based on the scores to obtain tuned telemetry collection parameters.

The adaptive feedback is generated by an adaptive score manager of a controller. The operations may further include, with the adaptive score manager receiving system data from the compute resources, determining, with an objective function engine, an assurance metric defining how close assurance requirements are met based on the system data, and generating, with an adaptive score engine, a feedback score based at least in part on the assurance metric. The system data defines at least one of node health, node availability, a health of the at least one application across the plurality of nodes, health of an infrastructure, or combinations thereof.

The operations may further include, with the adaptive score manager, generating, via a service level agreement (SLA) manager, at least one SLA policy based on user input, and generating, with the adaptive score engine, the feedback score based at least in part on the SLA policy. The adaptive feedback may be defined based on the feedback score.

The operations may further include collecting telemetric data from the compute resources for the nodes based on the tuned telemetry collection parameters. The disturbance features comprise any factors that impact the telemetry collection parameters used to generate a disturbance score.

Examples described herein also provide a federated policy-driven collection tuning device. The device may include a processor, and a non-transitory computer-readable media storing instructions that, when executed by the processor, causes the processor to perform operations. The operations may include with a collector, receiving source data defining at least one application running on a plurality of nodes. The nodes may utilize a finite number of compute resources. The operations may further include executing a number of score models within a scoring agent of the collector to define telemetry collection parameters used by the collector for source data collection, computing, with the scoring agent, a number of scores based on disturbance features and adaptive feedback, and tuning, with the collector, the telemetry collection parameters based on the scores to obtain tuned telemetry collection parameters.

The adaptive feedback may be generated by an adaptive score manager of a controller. The adaptive score manager may receive system data from the compute resources. The system data may define at least one of node health, node availability, a health of the at least one application across the plurality of nodes, health of an infrastructure, or combinations thereof. The operations may further include determining, with an objective function engine, an assurance metric defining how close assurance requirements are met based on the system data, and generating, with an adaptive score engine, a feedback score based at least in part on the assurance metric. The operations may further include generating, via a service level agreement (SLA) manager, at least one SLA policy based on user input, and generating, with the adaptive score engine, the feedback score based at least in part on the SLA policy. The adaptive feedback may be defined based on the feedback score.

The operations may further include collecting telemetric data from the compute resources for the nodes based on the tuned telemetry collection parameters. The disturbance features may include any factors that impact the telemetry collection parameters used to generate a disturbance score.

The plurality of nodes may form part of a microservice cluster architecture. The plurality of nodes may form part of a Kubernetes cluster architecture. The compute resources may include at least one of processing resources, memory resources, data storage resources, networking resources, or combinations thereof.

Additionally, the techniques described in this disclosure may be performed as a method and/or by a system having non-transitory computer-readable media storing computer-executable instructions that, when executed by one or more processors, performs the techniques described above.

Example Embodiments

Figure 1:
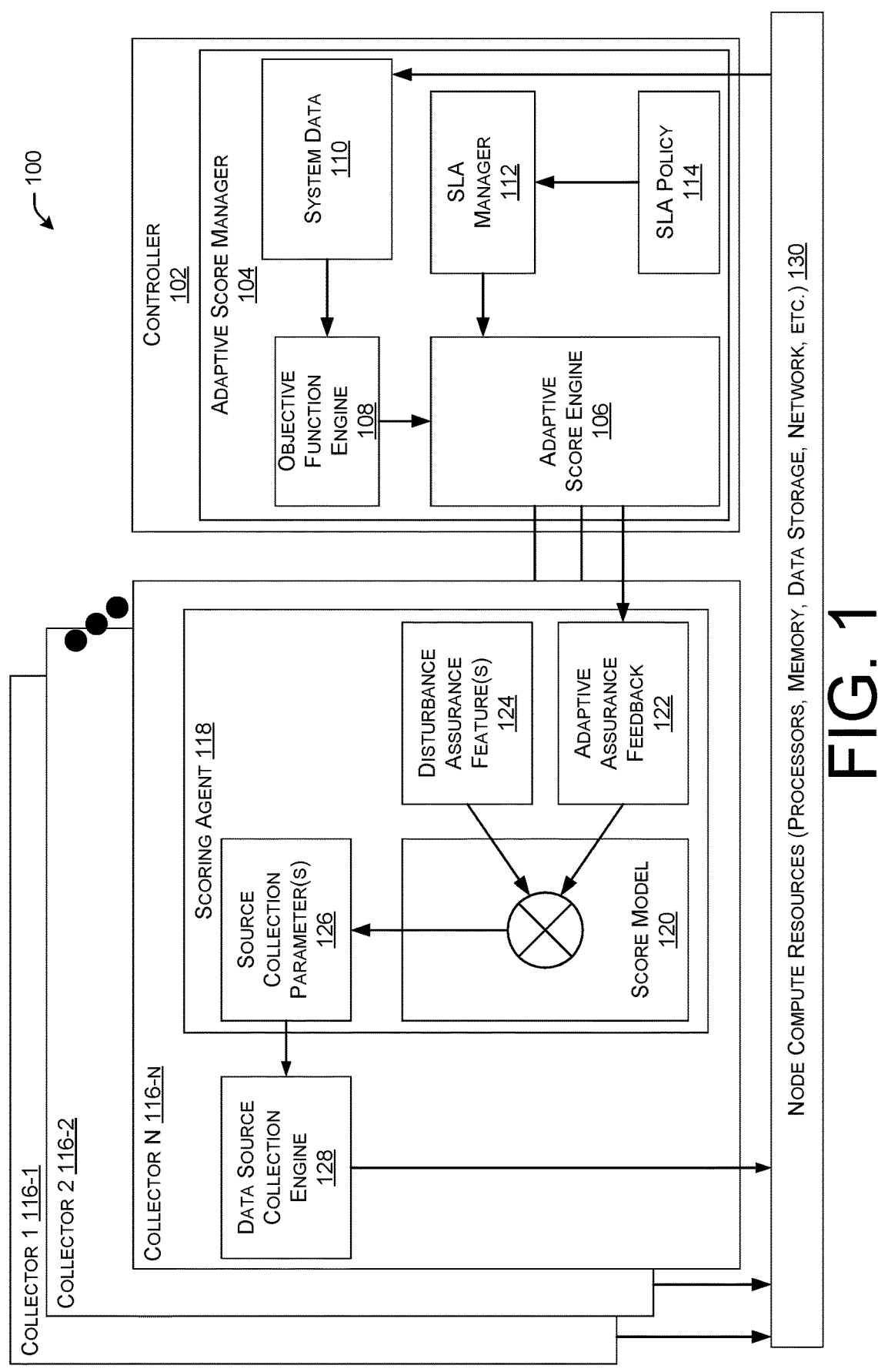
FIG. 1 illustrates a system for providing score model feedback control for collection parameter tuning, according to an example of the principles described herein.

Turning now to the figures, FIG. 1 illustrates a system 100 for providing score model feedback control for collection parameter tuning, according to an example of the principles described herein. The system 100 of FIG. 1 may include a controller 102 communicatively coupled to a number of collectors 116-1, 116-2, . . . 116-N where N is any integer greater than or equal to 1 (collectively referred to herein as collector(s) 116 unless specifically addressed otherwise). The collectors 116 may be included in a corresponding number of pods or nodes within a distributed microservice architecture such as a Kubemetes-based microservice architecture where Kubemetes-based management is provided. The controller 102 provides the collectors 116 with adaptive assurance feedback 122 for use in dynamically creating a score model 120. The controller 102 provides the adaptive assurance feedback 122 on a continuous or predetermined timing basis based on data collected from the node compute resources 130. As mentioned above, the compute resources 130 may include, for example, processing resources (e.g., processors, central processing units (CPUs), etc.), memory resources, data storage resources, networking resources, or combinations thereof.

It may be convenient, at the outset of this description to state that the system 100 seek s to optimize the collection of data from the node compute resources 130 and apply a feedback system for tuning telemetry collection parameters in the presence of multiple network management or network functions virtualization (NFV) applications that are subject to a resource constraint (e.g., the finite node compute resources 130). The methodology described herein includes a dynamic feedback loop framework which drives a score model 120. The score model 120 encompasses a number of objective functions of the applications, user intent, and telemetry consumption subject to a given resource condition. The distributed score model 120 may dynamically tune collection parameters based on a continuous system feedback for "M" applications having "N" objective functions within a given resource constraints "R." Further, the present systems and methods consider user intent "I" for the objectives. An equation representing these variables and their interaction is as follows:

$$\sum_{Time=Start}^{Time=End} \text{Iterating Score over feedback} \qquad \text{Eq. 1}$$

$$\left( \begin{array}{c} \max \text{ objective}_{function}(m \text{ apps with user intent } I), \\ \text{such that } \sum r(m) \leq R, \\ \text{where } \sum r(m) \leq R \text{ is resource of} \\ \text{each app} \leq \text{total fixed Resource } R \end{array} \right)$$

As indicated in Eq. 1, the present systems and methods solve the optimization problem that may arise due to opposing needs of the application layer, the resource layer, and the collection layer by having a self-balanced adaptive engine (e.g., adaptive score engine 106). Further, the present systems and methods include a distributed scoring model 120 with independent scoring agents 118 at different layers with closed loop feedback in order to provide dynamic control at the microservices layer. Further, the present systems and methods takes user intent into account and is flexible across varied deployments including cloud networking, edge networking, on-premises networking, and other deployment environments. In reference again to Eq. 1, consider "M" applications having "N" objective functions having to content with resources "R" and collecting "x" data-points, the present systems and methods achieve the optimized output across these layers along with user intent. A continuous feedback loop is created where each feedback loop has a "START" and an "END." The continuous feedback loop of Eq. 1 provides feedback in the form of user intent (e.g., any SLA policies 114), application intent (e.g., the objective function 108 of the application(s)), and system resource usage (e.g., dynamically determined from the monitoring of the node compute resources 130 and their availability). Thus, Eq. 1 seeks to maximize the objective functions of the application(s) given a number of constraints such as the finite node compute resources 130, resources allocated to the application(s), and user intent. This creates federated, policy-driven, collection parameter tuning systems and methods.

In one example, any artificial intelligence (AI)-driven or machine learning (ML) telemetry collection processes may be utilized to solve any collection layer issues. These AI and ML telemetry collection processes may provide overall optimization for a user installing, for example, software-defined networking (SDN) applications in on-premises, cloud, or edge networks in order to monitor the node compute resources 130.

The data collected from the node compute resources 130 may include any telemetry data associated with the node compute resources 130 and how the node compute resources 130 are being used, how strained the node compute resources 130 are in performing the processes associated with the microservice applications executed within the system 100, faults occurring among the microservice applications and/or node compute resources 130, other types of data, and combinations thereof. It is noted here that the collection parameters used to collect the data from the node compute resources 130 may be adjusted based on the processes described herein. Specifically, the adaptive assurance feedback 122 produced by the controller 102 and the adaptive score manager 104 may be used to dynamically tune or adjust the collection parameters in a continuous feedback loop.

The controller 102 may be included in any type of physical or virtual computing device that has access to the computing network in which the collector(s) 116 exist. As depicted in FIG. 1, the controller 102 may include the adaptive score manager 104 to receive and process data from the node compute resources 130 and any SLA policies 114 defined by an administrator. The telemetry data collected from the node compute resources 130 may be stored as system data 110. In one example, the system data 110 may include any type of data storage device capable of storing raw data obtained from the node compute resources 130. In one example, the system data 110 may include a data lake including any a system or repository of data stored in its natural/raw format. In one example, the data lake may store any type of data including raw copies of source system data, sensor data, and social data, among others types of data from the node compute resources 130 as well as any transformed data used for tasks such as reporting, visualization, advanced analytics, and machine learning. Further, the data lake may include any structured data from relational databases (e.g., rows and columns), semi-structured data (e.g., comma separated values (CSV), logs, extensible markup language (XML), JavaScript object notation (JSON), etc.), unstructured data (e.g., emails, documents, PDFs) and binary data (e.g., images, audio, video).

Returning again to FIG. 1, the adaptive score manager 104 may include an adaptive score engine 106. The adaptative score engine 106 included in the adaptive score manager 104 may determine whether the objective function is being met and a level of consistency or conformity with the objective function the collection parameters are allowing the system 100 to obtain (e.g., how far from or how close the objective functions are being met). The adaptive score engine 106 may generate a feedback score based on this conformity level. Thus, the objective functions are responsible for determining how close the system is to meeting the assurance requirements. The adaptive score engine 106 may use system data as needed to determine if that assurance is being met or not and how far off the assurance is. The feedback processes of the system 100 as described herein may attempt to balance node compute resources 130 usage while optimizing for the objective function. However, in one example, different users or administrators may have difference resource SLA requirements. For example, a first user may desire to be more aggressive and run resources hot and/or over-subscribe the node compute resources 130 to ensure maximum objective function is achieved, while others may be willing to comprise on the objective function for more efficient node compute resources 130 usage in the system 100. The SLA manager 112 and the associated SLA policies 114 may be used to allow flexibility based on the risk tolerance of the user/administrator as to how "hot" or how subscribed they want the node compute resources 130 for maintaining assurance of an application. The SLA manager may, in one example, provide three resource policies such as "over-subscribed," "default," and "under-subscribed." More regarding the SLA manager 112 and the SLA policies 114 are described below.

The system data 110 collected from the node compute resources 130 may be filtered through the objective function engine 108 so that when the adaptive score engine 106 defines the adaptive assurance feedback 122 for the collector(s) 116, the adaptive score engine 106 may take into consideration the data collected from the node compute resources 130 as well as any objective functions of the application(s) executed within the system 100. Further, a number of SLA policies 114 may be obtained from an administrator or otherwise provided to the system 100. The SLA policies 114 may be provided to an SLA manager 112 of the adaptive score manager 104 in order to allow the adaptive score engine 106 to take into consideration the user input as defined by the SLA policies 114 when the SLA manager 112 provides SLA requirements to the adaptive score engine 106. In this manner, the adaptive score engine 106 considers the collected data from the system data 110, the objective functions of the application(s) as provided by the objective function engine 108, and the SLA policies 114 as user input when computing the adaptive assurance feedback 122.

In one example, the adaptive score engine 106 may provide the adaptive assurance feedback 122 to a number of the collectors 116 within the system 100 simultaneously. In one example, the adaptive score engine 106 may provide the adaptive assurance feedback 122 to a selected number of the collectors 116 that may be less than all the collectors 116 within the system 100. It is noted that each collector 116 within the system includes the same elements as depicted within collector N 116-N.

A scoring agent 118 of the collector 116 may receive the adaptive assurance feedback 122 from the adaptive score engine 106 of the adaptive score manager 104 of the controller 102 and may utilize the adaptive assurance feedback 122 to create a score model 120. The score model 120 may be any intent score model that utilizes the health of components within the system 100 and the node compute resources 130, the relationship of the node compute resources 130, and any faults event in the clustering architecture to update the collection parameters in order to minimize node compute resource 130 usage and the MTTR. The score model 120 dynamically tunes the collection parameters at the collector 116 (e.g., a collection source) based on the continuous system feedback provided from the controller 102. The ability of the score model to dynamically tune the collection parameters provides for an efficient use of compute resources while also ensuring the objective function(s) of the application(s) as provided by the objective function engine 108 are achieved. The score model 120 may be used to represent collection parameters used by the collector 116 for source data collection.

The score model 120 represents a collection parameter at the collection source. The score model 120 may represent various collection parameters such as, for example, cadence, data types, and data size, among other collection parameters. Further, the score model 120 may utilize disturbance assurance feature(s) 124 and the adaptative assurance feedback 122 in computing a collection parameter score. The disturbance assurance feature(s) 124 may include a number of adjustable knobs that have been identified as disturbing or impacting corresponding collection parameters. The disturbance assurance feature(s) 124 may be computed in order to generate a disturbance score.

The adaptative assurance feedback 122 includes an adaptive assurance feedback score from the adaptive score engine 122 of the adaptive score manager 104 and may perform further computation on an adaptive assurance feedback score before passing the final score value to the score model 120.

The score model 120 may take the disturbance score produced by the disturbance assurance feature(s) 124 and the adaptive assurance feedback score produced by the adaptive score engine 106 and/or the adaptative assurance feedback 122 to generate a final parameter score. The final parameter score may then be used to set or define a number of collection parameters. In one example, the final parameter score may be equal to the sum of the disturbance score and the adaptive assurance feedback score. The final parameter score may be used to set one or more source collection parameter(s) 126 within the scoring agent 118. The source collection parameter(s) 126 may transmit the source collection parameter(s) 126 to a data source collection engine 128 which executes the source collection parameter(s) 126 as to the node compute resources 130.

The continuous loop produced by the execution of the data source collection engine 128 to apply the source collection parameter(s) 126 against the node compute resources 130 and the collection and processing of the collected data via the adaptive score manager 104 of the controller 102 and the scoring agent 118 of the collector 116 provides for the dynamic tuning of the collection parameters at the collection source of the collectors 116 based on a continuous system feedback. This dynamic tuning permits for an efficient use of the node compute resources 130 while also ensuring the assurance/objective of the application may be achieved. The present systems and methods provide a distributed scoring model, an assurance adaptive feedback loop, source collection optimization, and user resource policy SLA to allow flexibility based on individual user requirements and level of risk aversion.

Figure 2:
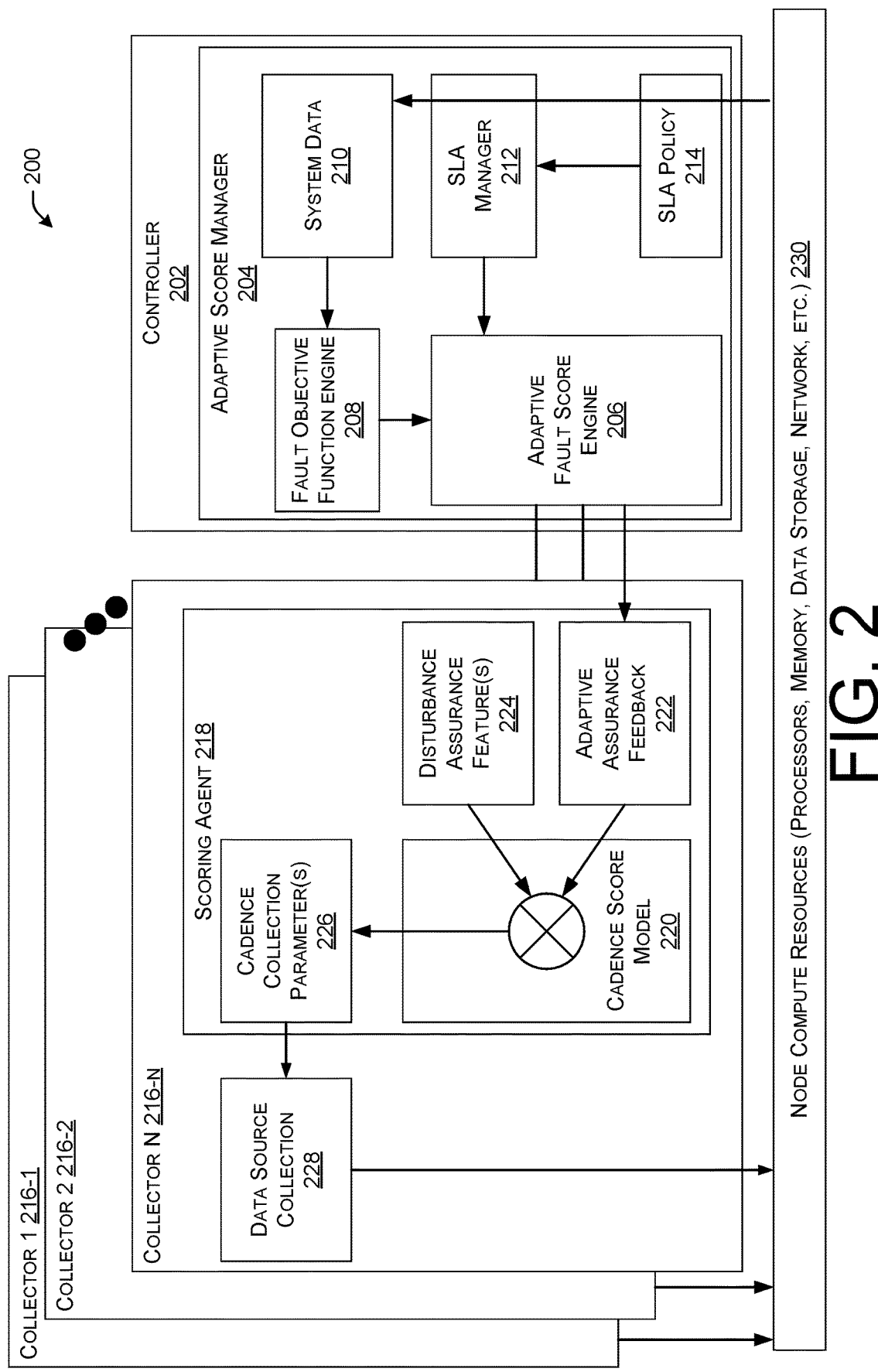
FIG. 2 illustrates a system for providing score model feedback control for collection parameter tuning within a fault assurance instance, according to an example of the principles described herein.

FIG. 2 illustrates a system 200 for providing score model feedback control for collection parameter tuning within a fault assurance instance, according to an example of the principles described herein. The elements of FIG. 2 correspond to the elements described above in connection with FIG. 1. Specifically, elements that share the last two digits of the three digit element indicators function in the same manner. For example, the controller 202, the adaptive score manager 204, the adaptive fault score engine 206, the fault objective function engine 208, the system data 210, the SLA manager 212, the SLA policies 214, the collectors 216-1, 216-2, . . . 216-N where N is any integer greater than or equal to 1 (collectively referred to herein as collector(s) 216 unless specifically addressed otherwise), the scoring agent 218, the cadence score model 220, the adaptive assurance feedback 222, the disturbance feature(s) 224, the cadence collection parameter(s) 226, the data source collection 228, and the node compute resources 230 of FIG. 2 may function in a manner similar to or identical to the controller 102, the adaptive score manager 104, the adaptive score engine 106, the objective function engine 108, the system data 110, the SLA manager 112, the SLA policies 114, the collectors 116, the scoring agent 118, the score model 120, the adaptive assurance feedback 122, the disturbance feature(s) 124, the collection parameter(s) 126, the data source collection 128, and the node compute resources 130 of FIG. 1, respectively.

A difference between the system 100 of FIG. 1 and the system of FIG. 2 is that the system 100 of FIG. 1 may be used in any type of distributed score model feedback control system for collection parameter tuning irrespective of the type of data being collected, the objective functions of the applications, and/or the data collected. In contrast the system 200 of FIG. 2 depicts an example of fault assurance in the context of a distributed score model feedback control system for collection parameter tuning.

Thus, having described the functions of the various elements of FIGS. 1 and 2, reference will now be made to the fault assurance example of FIG. 2. The score model 120 of the scoring agent 118 may be responsible for the gathering of health data for a given pod or node. In one example, the scoring agent 118 may determine that the source collection parameter(s) 126 should include a cadence (e.g., a period at which the data is collected) of once every 10 milliseconds (ms) or 5 seconds (s).

Further, in one example, the disturbance assurance feature(s) 224 may generate the disturbance score based on, for example, deployment state health, local pod or node health, and/or dependent neighbor pod or node health, among other factors as identified by the disturbance assurance feature(s) 224. Further, in this example, no additional computation may be performed by the adaptive fault score engine 206 to produce the adaptive assurance feedback 222, so this value may be passed through to the cadence score model 220. The cadence score model 220 may generate a score that represents a tuned value to set the cadence collection parameter(s) 226.

The adaptive score manager 204 of the controller 202 may utilize the system data 210 to determine the availability and health of the overall system 100 along with the pods or nodes that make up the application to help drive a fault feedback score as generated by the adaptive fault score engine 206. The fault objective function engine 208 may use the system data 210 including, for example, resource node health, system and/or pod or node availability health, system health, application health across the pods or nodes, infrastructure health and other factors for use by the adaptive fault score engine 206 in generating the adaptive assurance feedback 222. The adaptive fault score generated by the adaptive fault score engine 206 may indicate how much to adjust the collection parameter(s) to ensure fault assurance is maintained. The SLA policies may be adjusted by the user or administrator to a different SLA policy including, as mentioned above, "over-subscribed," "default," and "under-subscribed."

At steady state when the system 200 is healthy, the adaptive score manager 204 may generate a feedback score that indicates that the cadence collection parameter(s) 226 may be relaxed since there exists little risk in aggressively monitoring for faults. For example, the feedback score may be equal to 300. Further, at steady state when the system is healthy, the disturbance assurance feature(s) 224 may consider of the deployment health of the pods or nodes, local health, dependent neighboring health, and other factors, and may likewise generate a disturbance score that indicates the cadence collection parameter(s) 226 may be relaxed since there is little risk for aggressively monitoring for faults. For example, the disturbance score may be equal to 300. In this example, a final score value generated by the cadence score model 220 may include the sum of the disturbance score and the feedback score (e.g., 300+300=600). Thus, in this steady state example, the scoring agent 218 may generate a final cadence model score of 600. The collector 216 may use this final cadence model score to set the cadence collection parameter(s) 226 to 600 seconds. Given the overall state of system 200 is healthy, it may be expected that there is no need to be aggressive in using resources to monitor for faults.

However, in an example where a fault occurs within the system 200 such as reboot of a node, the adaptive score manager 204 may detect the fault and generate a relatively smaller-valued feedback score to be sent to the scoring agents 218 of the impacted nodes. This relatively smaller-valued feedback score may indicate that health collection should be performed more aggressively to ensure the necessary data is collected and to maintain fault assurance (e.g., to ensure that any necessary fault recovery and reporting occurs). In this example, the relatively smaller-valued feedback score may be, for example, 5. A fault may impact all or a subset of the disturbance assurance feature(s) 224. In the case of a reboot of the node, any neighboring node and local health may be impacted. As a result, a relatively smaller-valued disturbance score may be generated by the disturbance assurance feature(s) 224. Using the same scoring technique described above for the steady state example, the final cadence model score may be equal to the sum of the disturbance score and the feedback score (e.g., 5+5=10). Thus, the scoring agent 218 may generate a final cadence model score of 10. The collector 216 may use the final cadence model score to set the cadence collection parameter(s) to 10 seconds. In this manner, in an instance where a fault in the system 200 has occurred and is detected, a relatively more aggressive collection of data may be performed at the expensive of the node compute resources 230 in order to ensure fault assurance is achieved.

The following Tables 1 through 4 depict additional examples of trial model values that may be experienced in a fault assurance system as described above in connection with the example of FIG. 2. The pods or nodes within the system 200 may be checked periodically to determine the health of an application executed on the pods or nodes, any features being deployed within the system and the state of those features, and the health of neighboring pods or nodes. In one example, a score of 60 may indicate a healthy state of the application while a score less than 60 may indicate an unhealthy state.

TABLE 1

| First Trial Model Values | | | |
| --- | --- | --- | --- |
| Health | Healthy | Degraded | Down |
| Running Health Score | 60 | 5 | 1 |
| Workload Health Score | 60 | 5 | 1 |
| Resource Health Score | 60 | 5 | 1 |
| Feature | Status | | Score |
| Deploying | In Progress | | 1 |
| Deploying | Fail | | 1 |
| Deploying | Success/Steady State | | 60 |
| Destroying | In Progress | | 1 |
| Destroying | Fail | | 1 |
| Destroying | Success | | N/A |
| Neighbor Health | Healthy | Degraded | Down |
| Neighbor Health | 60 | 5 | 1 |

The issues that arise in the first trial model values depicted in Table 1 include a system boot time that increased by 3 to 4 minutes due to aggressive monitoring at system boot, and high availability (HA) triggers loss of noise and increased time observed for receiver due to monitor/thread contention.

TABLE 2

| Second Trial Model Values | | | |
| --- | --- | --- | --- |
| Health | Healthy | Degraded | Down |
| Running Health Score | 60 | 20 | 5 |
| Workload Health Score | 60 | 20 | 5 |
| Resource Health Score | 60 | 20 | 5 |
| Feature | Status | | Score |
| Deploying | In Progress | | 5 |
| Deploying | Fail | | 5 |
| Deploying | Success/Steady State | | 60 |
| Destroying | In Progress | | 5 |
| Destroying | Fail | | 5 |
| Destroying | Success | | N/A |
| Neighbor Health | Healthy | Degraded | Down |
| Neighbor Health | 60 | 20 | 5 |

The issues that arise in the second trial model values depicted in Table 2 include a system boot time that is increased by 1 to 2 minutes due to aggressive monitoring at system boot, and HA remains noisy and includes thread contention.

TABLE 3

| Third Trial Model Values | | | |
|---|---|---|---|
| Health | Healthy | Degraded | Down |
| Running Health Score | 60 | 30 | 10 |
| Workload Health Score | 60 | 30 | 10 |
| Resource Health Score | 60 | 30 | 10 |
| Feature | Status | | Score |
| Deploying | In Progress | | 10 |
| Deploying | Fail | | 10 |
| Deploying | Success/Steady State | | 60 |
| Destroying | In Progress | | 10 |
| Destroying | Fail | | 10 |
| Destroying | Success | | N/A |
| Neighbor Health | Healthy | Degraded | Down |
| Neighbor Health | 60 | 30 | 10 |

The issues that arise in the third trial model values depicted in Table 3 include a steady state noisy monitor that may be backed off further with respect to the examples in Tables 1 and 2. Further, the issues that arise in the third trial model values depicted in Table 3 may include a degraded transition that may last for some time and may be relaxed further with respect to the examples in Tables 1 and 2.

TABLE 4

| Fourth Trial Model Values | | | |
|---|---|---|---|
| Health | Healthy | Degraded | Down |
| Running Health Score | 100 | 40 | 10 |
| Workload Health Score | 100 | 40 | 10 |
| Resource Health Score | 100 | 40 | 10 |
| Feature | Status | | Score |
| Deploying | In Progress | | 10 |
| Deploying | Fail | | 10 |
| Deploying | Success/Steady State | | 100 |
| Destroying | In Progress | | 10 |
| Destroying | Fail | | 10 |
| Destroying | Success | | N/A |
| Neighbor Health | Healthy | Degraded | Down |
| Neighbor Health | 200 | 60 | 20 |

Here in the fourth trial model values depicted in Table 4, no major issues were reported on system performance or health. Thus, based on the above examples of Tables 1 through 4, the system 200 described herein allows for a score-based tuning of the collection intervals as provided by the cadence collection parameter(s) 226.

FIG. 3 illustrates a computing environment 300 in which the systems of FIGS. 1 and 2 may operate, according to an example of the principles described herein. The computing environment 300 may include a node 302 such as a virtual machine (VM) node. Any number of nodes 302 may exist within the computing environment 300. The node 302 may include a management application and/or a data lake 304. In one example, the data lake 304 may store any type of data including raw copies of source system data, sensor data, and social data, among others types of data from the node compute resources 130 as well as any transformed data used for tasks such as reporting, visualization, advanced analytics, and machine learning. Further, the data lake may include any structured data from relational databases (e.g., rows and columns), semi-structured data (e.g., comma separated values (CSV), logs, extensible markup language (XML), JavaScript object notation (JSON), etc.), unstructured data (e.g., emails, documents, PDFs) and binary data (e.g., images, audio, video). Further, the management application 304 may be used to manage a number of pods 306 within the management application and/or a data lake 304. The pod 306 may include a data management process 308 used to manage data obtained from the node compute resources 130, 230 via the collector 116, 216 as transmitted data 318.

The node 302 may be associated with a number of microservice application(s) 310-1, 310-2, . . . 310-N where N is any integer greater than or equal to 1 (collectively referred to herein as microservice application(s) 310 unless specifically addressed otherwise). The microservice application(s) 310 may include a number of pods 312-1, . . . 312-N where Nis any integer greater than or equal to 1 (collectively referred to herein as pod(s) 312 unless specifically addressed otherwise). The pods 312 may include the collectors 116, 216 as described above in connection with FIGS. 1 and 2. Further, the pods 312 may include a number of processes 314-1, 314-2, . . . 314-N where N is any integer greater than or equal to 1 (collectively referred to herein as processes(s) 314 unless specifically addressed otherwise). The local collector 116, 216 within the pod 312 is responsible for collecting data from the node compute resources 130, 230. The arrows running from the node compute resources 130, 230 and the processes 314 to the collector 116, 216 indicate a resource compute tax associated with collecting the data from the sources as source data 316. Resource strains may be observed with regards to source data 316 collection as opposed to the transmission of the transmitted data 318 to the collector 116, 216 from the node compute resources 130, 230 and from the collector 116, 216 to the management application and/or a data lake 304. The computing environment 300 presented in FIG. 3 may be extended to systems where a pod 312 includes a network device or node running a local collector 116, 216. The controllers 102 and 202 of FIGS. 1 and 2, respectively, may be communicatively coupled to collector 116, 216 of FIG. 3 as described above in connection with FIGS. 1 and 2.

FIG. 4 illustrates a flow diagram of an example method 400 of tuning telemetry collection parameters, according to an example of the principles described herein. The method 400 may include, with a collector 116, 216, receiving source data defining at least one application running on a plurality of nodes at 402. The nodes may utilize a finite number of compute resources 130, 230. At 404, the method 400 may further include, with the collector 116, 216, executing a number of score models 120, 220 within a scoring agent 118, 218 of the collector 116, 216 to define telemetry collection parameters used by the collector 116, 216 for source data collection. The method 400 may further include, at 406, computing, with the scoring agent 118, 218, a number of scores based on disturbance features 124, 224 and adaptive feedback 122, 222. At 408, the method 400 may further include tuning, with the collector 116, 216, the telemetry collection parameters 126, 226 based on the scores to obtain tuned telemetry collection parameters.

Figure 5:
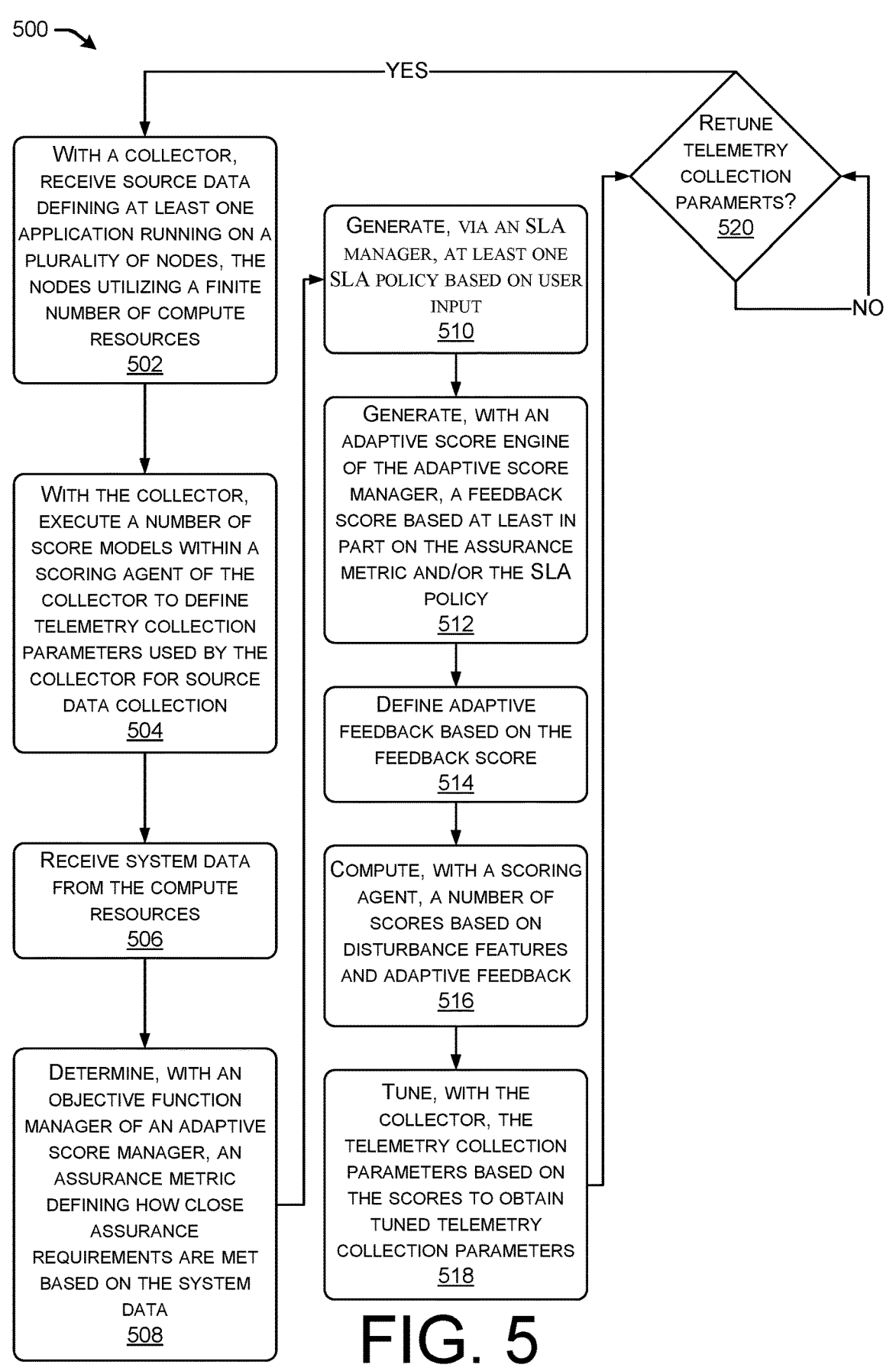
FIG. 5 illustrates a flow diagram of an example method of tuning telemetry collection parameters, according to an example of the principles described herein.

FIG. 5 illustrates a flow diagram of an example method 500 of tuning telemetry collection parameters, according to an example of the principles described herein. The method 500 may include, with a collector 116, 216, receiving source data defining at least one application running on a plurality of nodes at 502. The nodes may utilize a finite number of compute resources 130, 230. At 504, the method 500 may further include, with the collector 116, 216, executing a number of score models 120, 220 within a scoring agent 118, 218 of the collector 116, 216 to define telemetry collection parameters used by the collector 116, 216 for source data collection.

At 506, system data may be received from the compute resources 130, 230. The system data may define at least one of node health, node availability, a health of the at least one application across the plurality of nodes, health of an infrastructure, other types of systems data, and combinations thereof. Further, at 508, with an objective function engine 108, 208 of the adaptive score manager 104, 204, an assurance metric defining how close assurance requirements are met based on the system data may be determined. At 510, the SLA manager 112, 212 of the adaptive score manager 104, 204 may generate at least one SLA policy based on user input.

The method 500 may further include generating, with the adaptive score engine 106, 206 of the adaptive score manager 104, 204, a feedback score based at least in part on the assurance metric and/or the SLA policy at 512. At 514, adaptive feedback 122, 222 may be defined based on the feedback score generated at 512.

At 516, a number of scores based on disturbance features and/or the adaptive feedback. The scores may be computed via the score model 120, 220 of the scoring agent 118, 218 included within the collector 116, 216. Further, the disturbance features may include any factors that impact the telemetry collection parameters used to generate a disturbance score. The disturbance assurance feature(s) 124 (e.g., the disturbance features) may include a number of adjustable knobs that have been identified as disturbing or impacting corresponding collection parameters. The disturbance assurance feature(s) 124 may be computed in order to generate the disturbance score.

At 518, the method 500 may further include tuning, with the collector 116, 216, the telemetry collection parameters based on the scores (e.g., the scores obtained from the via the score model 120, 220 of the scoring agent 118 at 516) to obtain tuned telemetry collection parameters. These tuned telemetry collection parameters may be included in the source collection parameter(s) 126, 226 and used by the data source collection engine 128, 228 to collect the data from the node compute resources 130, 230.

At 520, the system 100, 200 may determine if the telemetry collection parameters should be retuned. A number of events may occur that trigger the system 100, 200 to retune the telemetry collection parameters including, for example, a rebooting of a node, and a fault detected among a number of nodes, among other events. In response to a determination that the telemetry collection parameters should not be retuned (520, determination NO), then the process may recursively return to 520 to make the same determination until a determination in the affirmative is obtained. In this manner, the system 100, 200 may continually determine if an event has occurred that may trigger a retuning of the telemetry collection parameters.

In response to a determination that the telemetry collection parameters should be retuned (520, determination YES), then the process loops back to 502, and the entire method of FIG. 5 is once again executed. In this manner, the telemetry collection parameters may be retuned any number of times in order to address the objective functions of the applications, user intent, and telemetry consumption subject to a given resource condition.

Figure 6:
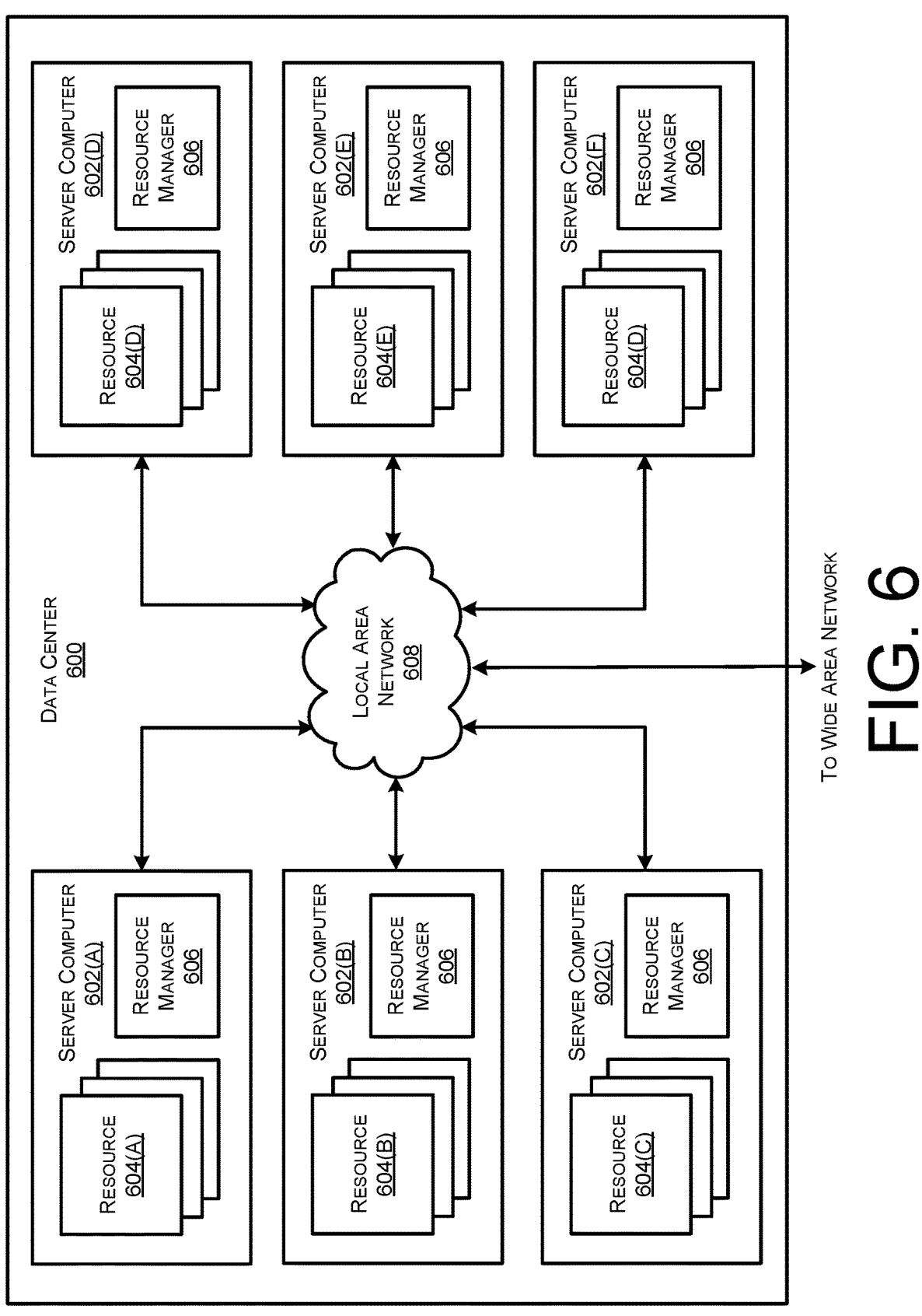
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
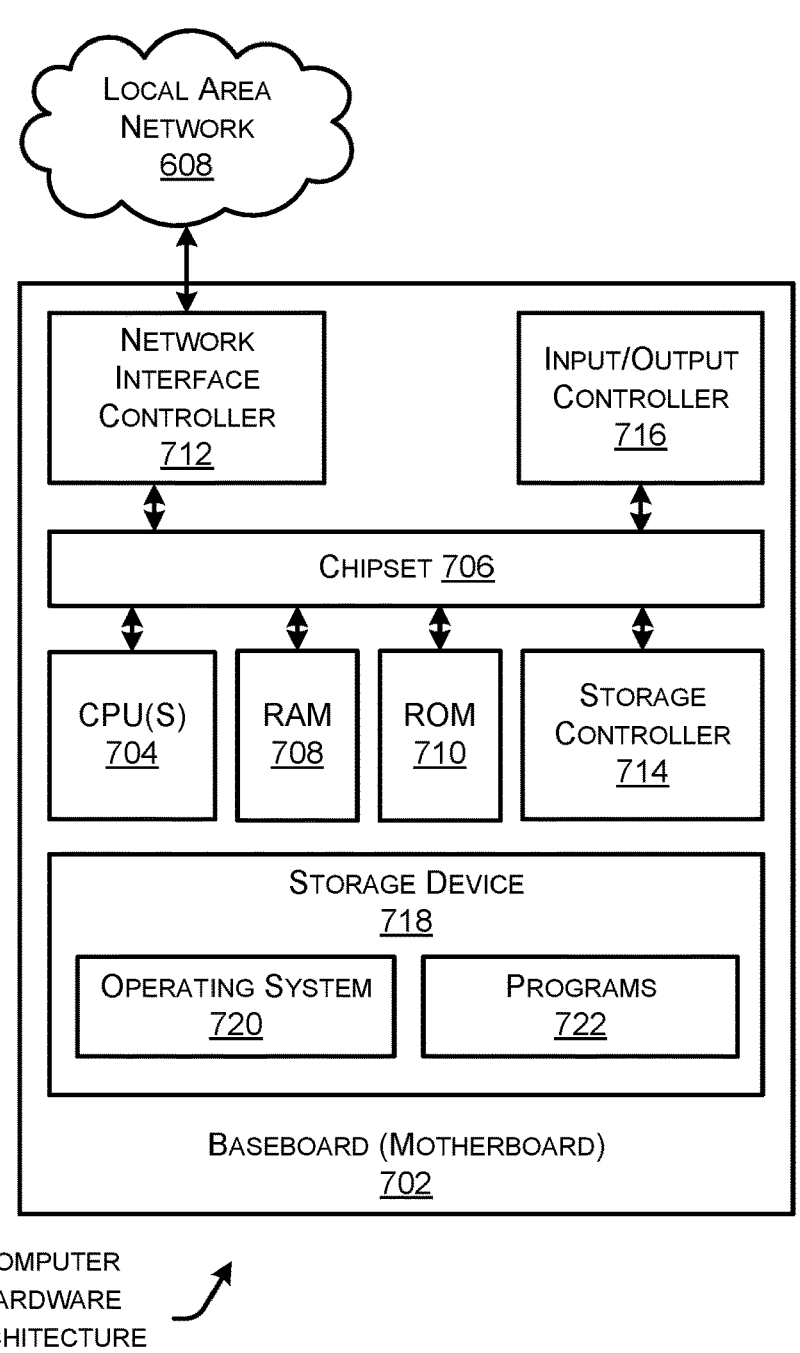
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the controller 102, 202, the collector 116, 216, the node compute resources 130, 230, the node 302, the system 100, 200, the computing environment 300, and/or other systems or devices associated with the controller 102, 202, the collector 116, 216, the node compute resources 130, 230, the node 302, the system 100, 200, and/or the computing environment 300 and/or remote from the controller 102, 202, the collector 116, 216, the node compute resources 130, 230, the node 302, the system 100, 200, and/or the computing environment 300, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the controller 102, 202, the collector 116, 216, the node compute resources 130, 230, the node 302, the system 100, 200, the computing environment 300 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the controller 102, 202, the collector 116, 216, the node compute resources 130, 230, the node 302, the system 100, 200, and/or the computing environment 300, among other devices. The chipset 706 may include functionality for providing network connectivity through a Network Interface Controller (NIC) 712, such as a gigabit Ethernet adapter. The NIC 712 is capable of connecting the computer 700 to other computing devices within the controller 102, 202, the collector 116, 216, the node compute resources 130, 230, the node 302, the system 100, 200, and/or the computing environment 300 and external to the controller 102, 202, the collector 116, 216, the node compute resources 130, 230, the node 302, the system 100, 200, and/or the computing environment 300. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the controller 102, 202, the collector 116, 216, the node compute resources 130, 230, the node 302, the system 100, 200, and/or the computing environment 300, and or any components included therein, may be supported by one or more devices similar to computer 700. Stated otherwise, some or all of the operations performed by the controller 102, 202, the collector 116, 216, the node compute resources 130, 230, the node 302, the system 100, 200, and/or the computing environment 300, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the controller 102, 202, the collector 116, 216, the node compute resources 130, 230, the node 302, the system 100, 200, and/or the computing environment 300, and/or other systems or devices associated with the controller 102, 202, the collector 116, 216, the node compute resources 130, 230, the node 302, the system 100, 200, and/or the computing environment 300 and/or remote from the controller 102, 202, the collector 116, 216, the node compute resources 130, 230, the node 302, the system 100, 200, and/or the computing environment 300. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the controller 102, 202, the collector 116, 216, the node compute resources 130, 230, the node 302, the system 100, 200, and/or the computing environment 300, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the controller 102, 202, the collector 116, 216, the node compute resources 130, 230, the node 302, the system 100, 200, and/or the computing environment 300 as described herein. The programs 722 may enable the devices described herein to perform various operations.

Conclusion

The examples described herein provide a federated, policy-driven telemetry collection that provides a feedback loop to dynamically tune the telemetry collection parameters at a source device. The present systems and methods provide for closed-loop data source and transmission adaptive data collection. The adaptative adjustment of the collection parameters may be based on a score model generated by an adaptive score manager of a controller associated with a scoring agent of a collector.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of tuning telemetry collection parameters, comprising:

receiving, for a collector associated with a controller that manages a plurality of nodes, objective data indicating an objective of the collector for collecting telemetry data from the plurality of nodes, the collector having available a finite number of compute resources on which to run;

receiving a telemetry collection parameter indicating a parameter at which telemetry data is collected by the collector from the plurality of nodes;

generating a disturbance score indicating an amount of disturbance caused to the telemetry collection parameter by a disturbance feature that impacts an ability of the collector to collect the telemetry data;

computing, based at least in part on the finite number of computing resources, the objective data, and the disturbance score, a tuned telemetry collection parameter for the collector, wherein:

computing the tuned telemetry collection parameter includes maximizing the objective of the collector given the finite number of compute resources; and the tuned telemetry collection parameter causes the collector to utilize less than the finite number of compute resources to collect the telemetry data according to a tuned parameter that achieves the objective of the collector while providing fault assurance against the disturbance feature;

tuning the telemetry collection parameter to result in the tuned telemetry collection parameter that achieves the objective of the collector.

2. The method of claim 1, further comprising:

receiving system data from the compute resources, the system data defining at least one of node health, node availability, a health of at least one application running on the plurality of nodes, or health of an infrastructure;

determining an assurance metric defining how close assurance requirements are met based on the system data; and generating a feedback score based at least in part on the assurance metric.

3. The method of claim 2, wherein the method further comprises:

generating, via a service level agreement (SLA) manager, at least one SLA policy based on user input; and generating a feedback score based at least in part on the SLA policy.

4. The method of claim 1, further comprising collecting telemetric data from the plurality of nodes based on the tuned telemetry collection parameter.

5. The method of claim 1, wherein the disturbance feature comprises a factor that the telemetry collection parameter uses to generate the disturbance score.

6. The method of claim 1, wherein computing the tuned telemetry collection parameter is further based on a service level agreement (SLA) policy based on user input, the SLA policy defining a user-specified preference for resource utilization.

7. The method of claim 1, wherein generating the disturbance score is based on a disturbance feature comprising at least one of deployment state health of a node, local pod health of a node, or dependent neighboring pod health.

8. The method of claim 1, further comprising:

receiving, at the collector, an adaptive assurance feedback score from the controller, wherein the computing the tuned telemetry collection parameter comprises combining the adaptive assurance feedback score with the disturbance score.

9. A non-transitory computer-readable medium storing instructions that, when executed, causes a processor to perform operations, comprising:

receiving, with a collector associated with a controller that manages a plurality of nodes, objective data indicating an objective of the collector for collecting telemetry data from the plurality of nodes, the collector having available a finite number of compute resources on which to run;

receiving a telemetry collection parameter indicating a parameter at which telemetry data is collected by the collector from the plurality of nodes;

generating a disturbance score indicating an amount of disturbance caused to the telemetry collection parameter by a disturbance feature that impacts an ability of the collector to collect the telemetry data;

computing, based at least in part on the finite number of computing resources, the objective data, and the disturbance score, a tuned telemetry collection parameter for the collector, wherein:

computing the tuned telemetry collection parameter includes maximizing the objective of the collector given the finite number of compute resources; and the tuned telemetry collection parameter causes the collector to utilize less than the finite number of compute resources to collect the telemetry data according to a tuned parameter that achieves the objective of the collector while providing fault assurance against the disturbance feature;

tuning the telemetry collection parameter to result in the tuned telemetry collection parameter that achieves the objective of the collector.

10. The non-transitory computer-readable medium of claim 9, further comprising:

receiving system data;

determining an assurance metric defining how close assurance requirements are met based on the system data; and generating a feedback score based at least in part on the assurance metric.

11. The non-transitory computer-readable medium of claim 10, wherein the system data defines at least one of node health, node availability, a health of at least one application running on the plurality of nodes, or health of an infrastructure.

12. The non-transitory computer-readable medium of claim 10, the operations further comprising:

generating, via a service level agreement (SLA) manager, at least one SLA policy based on user input; and generating the feedback score based at least in part on the SLA policy.

13. The non-transitory computer-readable medium of claim 9, the operations further comprising collecting telemetric data from the plurality of nodes based on the tuned telemetry collection parameter.

14. The non-transitory computer-readable medium of claim 9, wherein the disturbance feature comprises a factor that the telemetry collection parameter uses to generate the disturbance score.

15. A federated policy-driven collection tuning device comprising:

a processor; and a non-transitory computer-readable media storing instructions that, when executed by the processor, causes the processor to perform operations comprising:

receiving at a collector, objective data indicating an objective of the collector for collecting telemetry data from a plurality of nodes, the collector having available a finite number of compute resources on which to run;

receiving a telemetry collection parameter indicating a parameter at which telemetry data is collected by the collector from the plurality of nodes;

generating a disturbance score indicating an amount of disturbance caused to the telemetry collection parameter by a disturbance feature that impacts an ability of the collector to collect the telemetry data;

computing, based at least in part on the finite number of computing resources, the objective data, and the disturbance score, a tuned telemetry collection parameter for the collector, wherein;

computing the tuned telemetry collection parameter includes maximizing the objective of the collector given the finite number of compute resources; and the tuned telemetry collection parameter causes the collector to utilize less than the finite number of compute resources to collect the telemetry data according to a tuned parameter that achieves the objective of the collector while providing fault assurance against the disturbance feature;

tuning the telemetry collection parameter to result in the tuned telemetry collection parameter that achieves the objective of the collector.

16. The federated policy-driven collection tuning device of claim 15, the operations further comprising:

receiving system data defining at least one of node health, node availability, a health of at least one application executing on the plurality of nodes, a health of an infrastructure;

determining an assurance metric defining how close assurance requirements are met based on the system data;

generating, via a service level agreement (SLA) manager, at least one SLA policy based on user input; and generating a feedback score based at least in part on the SLA policy and the assurance metric.

17. The federated policy-driven collection tuning device of claim 16, wherein the plurality of nodes form part of a Kubernetes cluster architecture.

18. The federated policy-driven collection tuning device of claim 16, wherein the compute resources include at least one of processing resources, memory resources, data storage resources, networking resources, or combinations thereof.

19. The federated policy-driven collection tuning device of claim 15, the operations further comprising collecting telemetric data from the plurality of nodes based on the tuned telemetry collection parameter.

20. The federated policy-driven collection tuning device of claim 15, wherein the disturbance feature comprises a factor that the telemetry collection parameter uses to generate the disturbance score.

21. The federated policy-driven collection tuning device of claim 15, wherein the plurality of nodes form part of a microservice cluster architecture.

* * * * *